United States Patent [19]

Lüdke

[11] 4,182,826

[45] Jan. 8, 1980

[54] PROCESS FOR THE PRODUCTION OF RAPID-SET MOLDINGS

[75] Inventor: Heimo Lüdke, Schildgen, Fed. Rep. of Germany

[73] Assignee: Bayer Aktiengesellschaft, Leverkusen, Fed. Rep. of Germany

[21] Appl. No.: 884,449

[22] Filed: Mar. 8, 1978

Related U.S. Application Data

[63] Continuation of Ser. No. 709,840, Jul. 29, 1976, abandoned.

[30] Foreign Application Priority Data

Jul. 31, 1975 [DE] Fed. Rep. of Germany ....... 2534247

[51] Int. Cl.$^2$ ..................... C08G 18/22; C08G 18/08
[52] U.S. Cl. ........................................ 528/57; 528/44; 528/903; 264/54
[58] Field of Search .................. 260/77.5 NC, 75 NE; 264/54; 528/57, 903

[56] References Cited

U.S. PATENT DOCUMENTS

| | | | |
|---|---|---|---|
| 1,574,658 | 2/1926 | Johnston | 264/54 |
| 2,729,618 | 1/1956 | Muller et al. | 260/75 |
| 3,294,753 | 12/1966 | Beitchman et al. | 260/77.5 NC |
| 3,437,722 | 4/1969 | Cronin et al. | 264/48 |
| 3,645,975 | 2/1972 | Bernstein | 260/75 NE |
| 3,681,291 | 8/1972 | Khan | 528/57 |
| 3,697,485 | 10/1972 | Rambosek et al. | 260/77.5 NC |
| 3,711,444 | 1/1973 | Allen et al. | 260/77.5 NC |
| 3,842,036 | 10/1974 | Chow et al. | 260/77.5 NC |
| 4,126,741 | 11/1978 | Carleton et al. | 528/57 |

OTHER PUBLICATIONS

Bikales, Molding of Plastics (Encyclopedia Reprints), Wiley–Interscience (N.Y.) 1971, pp. 19, 20, 38, 39, 188, 192–194, 202 and 206.
Saunders et al.—Polyurethanes, Part I, Interscience (N.Y.) 1962, pp. 94–97 and 212.

*Primary Examiner*—H. S. Cockeram
*Attorney, Agent, or Firm*—Gene Harsh; Joseph C. Gil; R. Brent Olson

[57] ABSTRACT

The present invention relates to a process for the production of moldings based on organic polyisocyanates which have short in-mold times. The polyisocyanates are subjected to a polymerization reaction in closed molds in the presence of trimerization catalysts. The process is preferably carried out in the presence of compounds containing isocyanate-reactive groups where the equivalent ratio between NCO and NCO-reactive groups is greater than 1:0.8. The process has to be carried out in the absence of blowing agents, in order to produce nonfoamed moldings.

5 Claims, No Drawings

PROCESS FOR THE PRODUCTION OF RAPID-SET MOLDINGS

This is a continuation of application Ser. No. 709,840 filed July 29, 1976, and now abandoned.

BACKGROUND OF THE INVENTION

It is known (German Offenlegungsschrift No. 2,031,292) that solid and homogeneous polyurethane moldings may be produced by reacting substantially stoichiometric quantities of organic polyisocyanates and organic polyhydroxy compounds, provided that precautions are taken to ensure that the reaction mixture is substantially anhydrous and has a low content of compounds which are able to liberate $CO_2$ by reaction with the polyisocyanate compound. It is also known from the above-mentioned prior publication that the resulting polyurethane moldings may be made soft and elastic or hard by using particular polyhydroxy compounds and/or polyisocyanates.

A major disadvantage of this process is that, the solid moldings have to be heated in the mold for prolonged periods of up to 45 minutes at temperatures in the order of 100° C. Accordingly, this process is attended by distinct disadvantages so far as industrial mass production is concerned.

DESCRIPTION OF THE INVENTION

It has now been found that solid moldings with excellent physical and thermal properties may be produced in surprisingly short times if, in contrast to the conventional process, the polyurethane moldings are produced using polyisocyanates in a stoichiometric excess over polyhydroxyl compounds in the presence of additives which produce trimerization of that quantity of isocyanate groups exceeding the stoichiometric quantity which would be necessary to react with all hydroxyl groups present the reaction mixture.

Accordingly, the present invention relates to a process for the production of non-foamed solid moldings based on organic polyisocyanates which is distinguished by the fact that organic polyisocyanates are subjected to a polymerization reaction in closed molds in the presence of compounds which bring about the trimerization of isocyanate groups and in the absence of blowing agents in order to avoid the production of foamed moldings. The process may optionally be carried out in the presence of organic compounds containing isocyanate-reactive groups, the equivalent ratio between isocyanate groups and isocyanate-reactive groups being greater than 1:0.8, and optionally in the presence of further auxiliaries and additives. In the case where compounds containing isocyanate-reactive groups are present the polyisocyanates are subjected simultaneously to an isocyanate-addition reaction.

In all embodiments of the process of the present invention, the polyisocyanate component, optionally in combination with compounds containing isocyanate-reactive groups, is introduced under substantially anhydrous conditions in admixture with compounds which bring about the trimerization of isocyanate groups, optionally together with other additives of the type commonly used in polyisocyanate chemistry, such as activators (which accelerate the isocyanate-addition reaction), stabilizers, flameproofing agents, fillers, mold-release agents or dehydrating agents, into a closed mold in which the mixture reacts to form a non-foamed molding.

In cases where compounds containing isocyanate-reactive groups, preferably hydroxyl groups, are used, the equivalent ratio between isocyanate groups and isocyanate-reactive groups is greater than 1:0.8 and is generally from about 1:0.6 to about 1:0.01 and preferably from about 1:0.2 to 1:0.03. However, it is also possible in principle not to use compounds containing isocyanate-reactive groups because polymerization (trimerization) of the isocyanate groups in the polyisocyanate is in itself sufficient to produce a solid highly polymeric material having favorable mechanical properties. Both in the presence and in the absence of compounds containing isocyanate-reactive groups, the process of the present invention results in the formation of moldings which may be removed from the mold and used after a very short time without any need for a time-consuming after-treatment.

The process according to the present invention is preferably carried out in molds of a material with as high a heat capacity and as high a thermal conductivity as possible, preferably of metal. However, it is also possible to use molds of other materials, for example, plastics, such as polyepoxides or polyester resins, polyurethanes, and also of optionally coated wood, glass or concrete. In many cases, it is advisable to keep the temperature of the mold surface constant by means of air or a liquid, preferably water or oil. In general, the mold surface is maintained at a temperature of from about 50° to about 70° C.

Polyisocyanates suitable for use in the process of the present invention include any of the organic polyisocyanates known in polyurethane chemistry, such as tetramethylene diisocyanate; hexamethylene diisocyanate; m-xylylene diisocyanate; p-xylylene diisocyanate; 4,4'-dimethyl-1,3-xylylene diisocyanate; cyclohexane-1,4-diisocyanate; dicyclohexyl methane-4,4'-diisocyanate; m-phenylene diisocyanate; p-phenylene diisocyanate; 1-alkyl benzene-2,4- and -2,6-diisocyanates, such as tolylene-2,4- and -2,6-diisocyanate; 3-(α-isocyanatoethyl)-phenyl isocyanate; 1-benzyl benzene-2,6-diisocyanate; 2,6-diethyl benzene-1,4-diisocyanate; diphenyl methane-4,4'-diisocyanate; 3,3'-dimethoxy diphenyl methane-4,4'-diisocyanate; and naphthylene-1,5-diisocyanate. It is also possible to use trifunctional and higher polyfunctional polyisocyanates, for example, toluene-2,4,6-triisocyanate or polymethylene-polyphenyl-polyisocyanate mixtures obtained by condensing aniline with formaldehyde, followed by phosgenation. In addition, it is possible to use isocyanates which contain carbodiimide groups, uretdione groups, uretone imine groups and isocyanurate groups. Mixtures of the above-mentioned isocyanates may also be used. In addition, it is possible to use reaction products of polyhydric alcohols with polyvalent isocyanates or even polyisocyanates of the type used, for example, in accordance with German Pat. Nos. 1,022,789 and 1,027,394.

Polyisocyanates preferably used in the process of the present invention are diphenyl methane diisocyanates containing carbodiimide and/or uretone imine groups, of the type obtainable in accordance with U.S. Pat. No. 3,152,162. Also preferred are polyisocyanates containing urethane groups of the type which may be obtained by reacting 1 mol of 4,4'-diisocyanato diphenyl methane with from 0.05 to 0.3 mol of low molecular weight diols or triols, preferably polypropylene glycols having a molecular weight below 700; 2,4-diisocyanato toluene, optionally in admixture with 2,6-diisocyanato toluene; also liquid polyisocyanate mixtures of the type which may be obtained in known manner by phosgenating aniline/formaldehyde condensates. Mixtures of these preferred polyisocyanates are also preferably used.

The second essential component of the present reaction mixtures are compounds which bring about the trimerization of isocyanate groups. Catalysts of this type are known and are described, for example, in Saunders-Frisch, Polyurethanes, Part I, Interscience Publishers, 1962, on pages 94 and 95; and in Organic Chemistry, A Series of Monographs, Volume 9 (Cycloaddition reactions of hetero-cumulenes) by Henri Ulrich, Academic Press, New York, London, 1967, for example, on pages 128 to 133; and in Kunststoff Handbuch, Volume 7, by R. Vieweg and A. Hochtlen, Carl-Hanser-Verlag, Munich, 1966, for example page 17. Preferred catalysts are, for example, those which cause the isocyanate to gel with isocyanurate formation over a period of about 10 minutes at a temperature of 20° C. This occurs, for example, when a quantity of from 1 to 10 g of catalyst is allowed to act on 100 g of aromatic polyisocyanate. Catalysts of this type are, for example, alkali metal acetates, for example sodium and potassium acetate; alkali metal phenolates, such as sodium phenolate, and sodium trichlorophenolate; and, preferably, 2,4,6-tris-(dimethylaminomethyl)-phenol or a mixture of o- and p-dimethyl amino methyl phenol; alkaline earth metal oxides and alkali metal oxides. Other suitable catalysts are, for example, lead naphthenate, potassium oleate, lead benzoate and lead octoate.

Other catalysts suitable for use in the present invention are described in German Pat. No. 1,203,792, in British Pat. No. 1,001,746, in French Pat. No. 1,387,777, in U.S. Pat. No. 2,977,360, in German Auslegeschrift No. 1,146,889, in German Pat. No. 1,174,790, in French Pat. No. 1,343,812, in U.S. Pat. Nos. 3,154,522; 3,179,626 and 3,217,003, in Japanese Patent Publication No. Sho-85838/65, in British Pat. Nos. 821,158; 927,173 and 837,120 and in Ind. Eng. Chem. Prod. Development, 5 (1966), No. 1, pages 35 to 41.

Other catalysts suitable for the purposes of the present invention are basic compounds of the type which contain at least two aromatic nuclei and at least one araliphatically-bonded tertiary amine function in the molecule. Other suitable catalysts are, for example, Mannich bases of dimethyl amine, formaldehyde and phenols of the type which contain at least one organic substituent having at least 6 carbon atoms in the molecule. It is also possible to use as catalysts Mannich bases of phenols and which, in addition to the substituted amino methyl group and the phenolic OH-group, contain at least one other group containing isocyanate-reactive hydrogen atoms.

The trimerization catalysts used in the present process are generally employed in quantities of from about 0.1 to about 10%, by weight, and preferably from 0.1 to 2.0%, by weight, based on the polyisocyanate component.

As mentioned above, the process may be carried out in the absence of compounds containing isocyanate-reactive groups. However, it is preferred to use compounds of this type. Suitable compounds of this type are, in particular, any alcoholic hydroxyl compounds, optionally containing ether and/or ester groups, having molecular weights of from about 32 to about 4000, i.e. low molecular weight or even relatively high molecular weight monohydric or polyhydric alcohols or mixtures of such compounds.

In cases where monohydric alcohols only are used as the compounds containing isocyanate-reactive groups, one factor which has to be taken into consideration is that, on account of their monofunctionality, compounds of this type have a chain-terminating effect. When monohydric alcohols are exclusively used, the NCO-:OH equivalent ratio should be greater than 1:0.5. Preferred compounds containing isocyanate-reactive groups are the polyhydroxyl compounds having molecular weights of from about 62 to about 4000 which are well known in polyurethane chemistry.

Examples of monohydric alcohols suitable for use in the process of the present invention include: methanol, ethanol, n-butanol, n-dodecanol, n-octadecanol, isopropanol, sec-butanol, cyclohexanol or even alkoxylation products of these monohydric alcohols, i.e. in particular polyether alcohols obtainable by ethoxylating and/or propoxylating alcohols of this type. Monohydric alcohols containing ester groups, such as ethylene glycol monoacetate, are also suitable.

Suitable polyhydroxyl compounds include both low molecular weight polyols (molecular weight range: from 62 to 400), such as ethylene glycol, diethylene glycol, 1,4-butane diol, 1,4-butene diol, 1,4-butyne diol, 1,6-hexane diol, 1,8-octane diol, trimethylol propane, glycerol, pentaerythritol, sorbitol or saccharose polyols. Suitable polyhydroxyl compounds iof relatively high molecular weight are, in particular, polyhydroxy polyethers or polyhydroxy polyesters having molecular weights of from about 400 to about 4000. Polyhydroxy polyethers of this type may be obtained by the addition of alkylene oxides, such as ethylene oxide, propylene oxide, butylene oxide or styrene oxide, to compounds containing active hydrogen atoms which serve as starting components. Starting components of this type are, for example, water; polyols, such as ethylene glycol, propylene glycol, butylene glycol, trimethylol propane or glycerol; amines, such as ammonia, ethylene diamine, hexamethylene diamine, 4,4'-diaminodiphenyl methane, 2,4'-diaminodiphenyl methane, 2,4-diaminotoluene, 2,6-diaminotoluene or aniline; amino alcohols, such as amino ethanol or diethanolamine; and polyphenols, such as hydroquinone or 4,4'-dihydroxy diphenyl methane. The alkylene oxides may also be added in admixture, in which case a block-form arrangement of the alkylene oxide radicals in the adduct or an alternating arrangement may be obtained. The polyethers may contain secondary or primary hydroxyl groups. In many cases, it is preferred to use polyethers containing terminal primary hydroxyl groups. Polyethers having a hydroxyl group content of from 0.5 to 18% are often preferred. Polyesters of the type obtained, for example, by reacting the above-mentioned polyhydric alcohols with polybasic carboxylic acids, are also suitable. Examples of polybasic carboxylic acids are phthalic acid, terephthalic acid, succinic acid, adipic acid, octane-1,8-dicarboxylic acid and maleic acid. It is also possible to use polyesters containing amide groups of the type obtained by using amino alcohols, diamines or amino-carboxylic acids. Polycaprolactones may be used.

It is also possible to use polyesters and polyester amides containing double and triple bonds and modifying radicals of unsaturated and saturated fatty acids or fatty acid alcohols.

Thioethers containing hydroxyl and/or mercapto groups and compounds which contain carboxyl groups and/or cyclic anhydride groups and which may additionally contain ether, ester, amide, urea, urethane or ether groups, may also be used.

It is also possible to use primary and/or secondary amines, such as aniline, 1,4-diaminobenzene, hexamethylene diamine or 3,3'-dichloro-4,4'-diaminodiphenyl methane, as compounds containing isocyanate-reactive groups.

Mixtures of the compounds containing isocyanate-reactive groups which are exemplified above may be used in the process according to the present invention.

In addition to the above-mentioned starting materials, it is also possible to use the additives commonly used in polyurethane chemistry, such as activators for accelerating the isocyanate addition reaction, stabilizers, flame-proofing agents, fillers, mold-release agents, dehydrating additives or even plasticizers.

Suitable activators for accelerating the isocyanate polyaddition reaction are, for example, dimethyl benzyl amine, N-methyl-N'-(N,N-dimethylaminoethyl)-piperazine, triethylene diamine, permethylated diethylene triamine, organo tin compounds, such as, dibutyl tin dilaurate or tin(II)octoate.

Suitable stabilizers to improve the compatibility of the components include, the polyether polysiloxanes which are known in polyurethane chemistry, and sulphonated caster oils or the alkali metal salts thereof.

Suitable mold release agents include any known internal mold release agents of the type recommended for the production of molded foams and described, for example, in German Offenlegungsschrifts Nos. 1,953,637; 2,121,670 and 2,356,692. It is of course also possible to use "self-releasing" polyisocyanates modified with corresponding additives.

Suitable water-absorbing substances are compounds that are highly reactive to water, such as tris-(chloroethyl)-orthoformate, and also the water-binding fillers exemplified below.

Suitable plasticizers are, for example, triscresyl phosphate, tri-(2-chloroethyl)-phosphate or chlorinated hydrocarbons, especially those based on polyphenyl.

The specific strength of the moldings obtainable in accordance with the present invention may be considerably increased by adding fillers to the reaction mixture. These fillers may be both organic and inorganic fillers. The increase in specific strength is particularly pronounced in cases where large-surface or fibrous fillers are used, for example, glass fibers, asbestos fibers, metal powders, metal fibers and synthetic fibers. In the case of organic fillers, which may be used in powder form and/or in emulsion form, it is possible to use both duroplasts and, better still, thermoplastic materials, such as homopolymers or copolymers of mono- or poly-unsaturated olefins, acrylonitrile, unsaturated carboxylic acid esters, styrene, vinyl chloride and vinylidene chloride. Cellulose derivatives, polyamides, polyimides, polycarbonates, polyoxymethylenes and carbon fibers may also be used as fillers in the above sense. It is of advantage to use fillers with water-binding properties, such as alkaline earth metal oxides, zeolites, aluminum oxides and silicates.

So far as the practical application of the moldings produced according to the present invention is concerned, it is frequently of advantage to also reinforce the moldings either locally or over their entire surface for fastening the elements, for initiating local forces and for increasing strength. This may advantageously be accomplished, for example, by introducing into the mold before it is filled three-dimensional structures of metal, plastics or plywood through which the reaction mixture is able to flow. Three-dimensional reinforcements of this type, to which the reaction mixture introduced shows satisfactory adhesion for the intended application, may be such reinforcements as expanded metal, honeycomb materials, three-dimension needled, quilted or synthetic-binder-fixed non-wovens, woven fabrics, knitted fabrics, or net fabrics. In cases where reinforcements of this type are arranged in the mold before the reaction mixture is introduced, the reinforcing systems remain in the required position and, hence guarantee the required local or complete-surface stiffening effect. It is also possible, especially for locally initiating forces, to use large-surface reinforcements projecting into the molding of, for example, metals, plastics or plywood, which are in turn carefully fixed in the mold to be filled with foam.

The moldings obtainable by the process according to the present invention may be used for the production of furniture, in the building industry, in the vehicle industry, for technical articles of any type, for utility articles for domestic and every-day use, for the electrical industry, for the sanitary industry or even for sports and leisure goods.

The main advantage of the present process is in the fact that it is now possible for the first time to obtain solid moldings based on polyisocyanates which are suitable for mass production on a commercial scale. The moldings produced by the present process may be removed from the mold after only a short time (from 0.25 to 2.5 minutes after filling of the mold). This is extremely surprising because both the process according to German Offenlegungsschrift No. 2,031,292 for the production of solid moldings and also the process according to German Offenlegungsschrift No. 1,794,117 for the production of foam moldings required much longer in-mold times.

The following Examples illustrate the invention. General procedure for producing the moldings:

Components A and B mentioned in the specific Examples are briefly degassed at room temperature under about 20 Torr in cases where the components have a high gas content, but otherwise are used without any further pretreatment. It is is in general not necessary to remove traces of water which often are present in the starting materials such as e.g. technical grade polyether or polyester polyols since these traces of water are not sufficient to cause formation of foamed materials. By means of a two-component metering and mixing unit resp. by weighing in the ratios, by weight, indicated in a mixing vessel, the components are metered, intensively and carefully mixed in such a way that very few, if any, air bubbles are stirred into the reaction mixture, and the resulting mixture introduced into a closed mold. The reaction mixture is preferably prepared at room temperature, while the mold is tempered to approximately 65° C. and is maintained at that temperature throughout the entire production process. After the brief period indicated, the moldings are removed from the mold, having hardened to the extent that they are resistant to plastic deformation. They may be used and tested immediately after cooling.

EXAMPLE 1

Component A 15 parts, by weight, of a polyether, obtained by the addition of propylene oxide to trimethylol propane (OH number 550); 85 parts, by weight, of a polyether obtained by the addition of 87% of propylene oxide and 13% of ethylene oxide to trimethylol propane (OH number 36); 1 part, by weight, of a standard commercial-grade silicone stabilizer (L 5340 of Union Carbide Corp. which is believed to be a polyetherpolysiloxane); 0.6 part, by weight, of sodium acetate, dissolved in 2.4 parts, by weight of ethylene glycol; 2 parts, by weight, of dimethyl benzyl amine.

Component B 250 parts, by weight, of a polyisocyanate containing urethane groups obtained by modifying a phosgenation product of an aniline formaldehyde condensate containing approximately 79%, by weight, of diisocyanato diphenyl methanes with 3%, by weight, of tripropylene glycol, based on the polyisocyanate mixture to be modified. Viscosity of the modified polyisocyanate mixture at 25° C.=90 mPa.s.
NCO-content: 28%, by weight
Properties of the molding:
  density:—1.15 g/cm$^3$
  molding time:—1.5 minutes
  shore-D-hardness:—68°
  dimensional stability to heat (DIN 53,424)—165° C.

EXAMPLE 2

Component A 25 parts, by weight, of a polyester obtained from adipic acid-phthalic acid (ratio, by weight, 1:4.2) and dipropylene glycol (OH number 196);
  20 parts, by weight, of a polyether obtained by the addition of 55% of ethylene oxide and 45% of propylene oxide to glycerol (OH number 56);
  10 parts, by weight, of trichloroethyl phosphate;
  0.6 part, by weight, of sodium acetate dissolved in 2.4 parts, by weight, of ethylene glycol.

Component B 100 parts, by weight, of a polyisocyanate mixture, obtained by phosgenating an aniline formaldehyde condensate, having a viscosity at 25° C. of 100 mPa.s and an NCO-content of 31.5%, by weight.
Properties of the molding:
  density:—1.1 g/cc
  molding time:—1.75 minutes
  shore-D-hardness:—75°
  dimensional stability to heat (DIN 53,424)—142° C.
  flameproofed in accordance with UL-subject 94 V 0

EXAMPLE 3

Component A 50 parts, by weight, of a polyether obtained by the addition of propylene oxide to ethylene diamine (OH number 630);
  50 parts, by weight, of a polyether obtained by the addition of 87% of propylene oxide and 13% of ethylene oxide to propylene glycol (OH number 28);
  0.3 part, by weight, of potassium acetate, dissolved in approximately 1.2 parts, by weight, of ethylene glycol.

Component B 200 parts, by weight, of polyisocyanate according to Example 2.
Properties of the molding:
  density:—1.2 g/cc
  molding time:—1.25 minutes
  shore-D-hardness:—73°
  dimensional stability to heat (DIN 53,424)—135° C.

What is claimed is:

1. A process for the production of solid non-foamed moldings, consisting essentially of: (A) polymerizing an organic polyisocyanate in a closed metal mold in the presence of compounds which bring about the trimerization of isocyanate groups and in the presence of compounds containing isocyanate-reactive groups and in the absence of blowing agent in order to avoid the production of foamed moldings and wherein the temperature of the surfaces of said metal mold are maintained at from about 50 to about 70° C. and wherein the equivalent ratio between isocyanate groups and isocyanate-reactive groups is from about 1:0.2 to 1:0.03 and (B) removing the molding from said mold 0.25 to 2.5 minutes after filling of said mold with said reactants.

2. The process of claim 1 wherein said catalyst is selected from the group consisting of alkali metal acetates, alkali metal phenolates, alkaline earth metal oxides and alkali metal oxides.

3. The process of claim 1 wherein organic and/or inorganic fillers are used.

4. The process of claim 1 wherein three-dimensional structural reinforcements are introduced into the mold prior to filling with reaction mixture.

5. Moldings obtained according to the process of claim 1.

* * * * *